US007495209B2

(12) United States Patent
Baykut et al.

(10) Patent No.: US 7,495,209 B2
(45) Date of Patent: Feb. 24, 2009

(54) CONTROL OF THE FILLING LEVEL IN ION CYCLOTRON RESONANCE MASS SPECTROMETERS

(75) Inventors: Gökhan Baykut, Bremen (DE); Christian Berg, Roslindale, MA (US); Jochen Franzen, Bremen (DE)

(73) Assignee: Bruker Daltonik GmbH, Bremen (DE)

( * ) Notice: Subject to any disclaimer, the term of this patent is extended or adjusted under 35 U.S.C. 154(b) by 242 days.

(21) Appl. No.: 11/440,803

(22) Filed: May 25, 2006

(65) Prior Publication Data

US 2006/0284070 A1 Dec. 21, 2006

(30) Foreign Application Priority Data

Jun. 3, 2005 (DE) ...................... 10 2005 025 498

(51) Int. Cl.
*B01D 59/44* (2006.01)

(52) U.S. Cl. ...................................... 250/282; 250/281

(58) Field of Classification Search ......... 250/281-300, 250/306-443.1

See application file for complete search history.

(56) References Cited

U.S. PATENT DOCUMENTS 4,978,852 A * 12/1990 Williams et al. ............ 250/282
6,600,154 B1 7/2003 Franzen et al.
2003/0042415 A1 3/2003 Hager

FOREIGN PATENT DOCUMENTS

| | | | |
|---|---|---|---|
| DE | 197 09 172 | A1 | 9/1998 |
| GB | 2 280 781 | A | 2/1995 |
| GB | 2 364 821 | A | 2/2002 |
| GB | 2406434 | A | 3/2005 |
| WO | 03019614 | A2 | 3/2003 |
| WO | WO 2004/068523 | A2 | 8/2004 |
| WO | WO 2006/014284 | A1 | 2/2006 |

OTHER PUBLICATIONS

Jeffries, J.B., et al., "Theory of Space-Charge Shift of Ion Cyclotron Resonance Frequencies", International Journal of Mass Spectrometry and Ion Processes, 1983, pp. 169-187, Issue 54, Elsevier Science Publishers B.V., The Netherlands.

* cited by examiner

*Primary Examiner*—David A. Vanore
*Assistant Examiner*—Andrew Smyth
(74) *Attorney, Agent, or Firm*—Law Offices of Paul E. Kudirka

(57) ABSTRACT

The invention relates to methods and devices for regulating the filling level in measuring cells of ion cyclotron resonance mass spectrometers so that it is optimal for mass resolution and mass accuracy. The invention consists in supplying a fraction of the samples to a second reference mass spectrometer operated in parallel, and employing the mass spectra obtained from this reference mass spectrometer to regulate the filling level in the ion cyclotron resonance mass spectrometer.

12 Claims, 1 Drawing Sheet

CONTROL OF THE FILLING LEVEL IN ION CYCLOTRON RESONANCE MASS SPECTROMETERS

RELATED APPLICATIONS

The invention relates to methods and devices for regulating the filling level in measuring cells of ion cyclotron resonance mass spectrometers so that it is optimal for mass resolution and mass accuracy.

BACKGROUND OF THE INVENTION

Ion cyclotron resonance mass spectrometers (ICR-MS), also known as Fourier transform mass spectrometers (FTMS) or, in full, as Fourier transform ion cyclotron resonance mass spectrometers (FTICR-MS), are at present the mass spectrometers that offer the highest mass resolution and the most accurate measurement of mass. In these spectrometers, the ions are excited into cyclotron movement under ultrahigh vacuum conditions in a very intense magnetic field of seven, nine, twelve or even fifteen Tesla, generated by superconducting coils held at the temperature of liquid helium, and the frequency of these circulating movements of the ions is measured. The frequencies are inversely proportional to the masses of the ions. Since the magnetic field generated by the superconducting coils is extraordinarily stable, and since frequency measurements are amongst the most accurate measurements that can be taken by today's physical technology, the masses of the circulating ions can be determined with greater accuracy than by any other type of mass spectrometer.

Unfortunately, this ion cyclotron frequency is shifted by the space charge that is created by the ions in the measuring cell of the ICR-MS. A "reduced cyclotron frequency" is measured, which is non-linearly dependent on the strength of the space charge. This has been known for a long time. The publication by J. B. Jeffries, S. E. Barlow and G. H. Dunn, International Journal of Mass Spectrometry and Ion Processes 54, 169-187, (1983) gives a theoretical description of the frequency shift as a consequence of space charge. If the space charge varies from one scan to the next because it is not regulated, it can cause a shift in the mass signal that differs every time.

At higher ion densities, a further undesirable phenomenon, known as "peak coalescence", occurs in ICR mass spectrometry. Signals from ions whose masses only differ very slightly converge, and in extreme cases the ion signals may even completely merge. The result of this merging is, in most cases, another high-resolution ion signal that wrongly indicates an apparent mass lying between the true masses of the two ion species. The analysis of ion signals that lie very close together is, however, a task that ICR mass spectrometers are often called upon to perform.

Any kind of frequency shift will result in incorrect mass measurements, and must therefore be avoided. Control methods for filling the measuring cell of an ICR-MS are therefore described in patent specification U.S. Pat. No. 6,555,814 B1 (G. Baykut, J. Franzen). The control methods described there, however, always refer to the measurement of the total ion current (or of a fixed proportion of the total ion current) alone, with the result that the regulation of the filling level is always focused on the total ion charge that has been inserted into the measuring cell. Experience, however, shows that maintaining a constant charge quantity does not protect against various kinds of non-reproducible frequency shifts. In addition to the total charge, the precise composition of the mixture of ions of different mass and charge also plays a role, as is already clear from the phenomenon of ion signal merging that has been mentioned above.

Electrospray ionization is nowadays the most widely used ionization method for the ICR mass spectrometry of biomolecules. In this method, ions are generated out of the solution of the analyte molecules at atmospheric pressure under high voltage (3-6 kV) between an electrospray needle and a counter-electrode. Although the spraying procedure is often supported by a slow, finely controllable spray pump (or by a liquid chromatography feed pump, known by the acronym HPLC), the driving force of the spraying method is the detachment of small, charged droplets resulting from a high ion density on the liquid surface (Coulomb repulsion) under the influence of a powerful electrical field. A "dry gas" that flows in the direction opposite to that of the flight of the charged droplets causes the solvent to evaporate from the droplets (the desolvation process), therefore causing the droplet radii to diminish. As a result of the Coulomb forces that have been strengthened in this way, ionized molecules are evaporated, in most cases in multiply protonated form, i.e. as positively charged ions. These ions are fed for measurement to the mass spectrometer through an inlet capillary, a multi-stage vacuum system and a multipole ion guide.

Electrospray ionization under atmospheric pressure has made it very easy to couple separation methods for dissolved analyte substances, such as liquid chromatography or capillary electrophoresis, directly to the mass spectrometer. Ionization by laser desorption (LDI) has for a long time been used successfully to transfer large organic molecules from a solid surface into the gaseous phase, and thereby to ionize them. A special type of LDI is ionization by matrix-assisted laser desorption (MALDI). MALDI involves the analyte molecules being mixed with what is known as a matrix substance. The ratio of analyte to matrix molecules here is typically between $1:10^2$ and $1:10^4$. The laser beam is absorbed by matrix molecules; in the process, a portion of this matrix material evaporates, taking analyte molecules with it into the gaseous phase. The process partially ionizes them. In most cases the ionization occurs by proton acceptance. Substances used as a matrix are most often proton donors, i.e. substances that easily give up protons.

SUMMARY OF THE INVENTION

According to the invention, an ICR mass analyzer and a reference mass analyzer are operated in parallel, and a fraction each of the same mixtures of ions obtained from the same flow of substance mixtures by the same ionization methods are supplied to both mass analyzers. The reference mass spectra from the reference mass analyzer are then used to extract parameters that can be used to control the filling process of the measurement cell of the ICR mass analyzer. The two mass analyzers can belong to two different mass spectrometers, each having, for instance, their own ion sources, but may also be integrated into a single device.

The mixtures of ions can be fed to the reference mass analyzer somewhat earlier than to the ICR mass analyzer, in order to provide sufficient time to evaluate the reference mass spectrum and to control filling of the measuring cell of the ICR mass analyzer at exactly the moment at which the same ion mixture that was measured by the reference mass analyzer is fed to the ICR mass analyzer. This is of particular importance in the case of quickly changing sample substance mixtures, as delivered by separation methods like liquid chromatography or capillary electrophoresis.

The flows of substance from separation procedures of this type can be coupled indirectly, for instance by coating a MALDI sample support plate, or may be coupled directly, for instance through a splitter that guides the eluate to two ion sources belonging to the two mass spectrometers. A delay loop in the capillary feed line can then be used to supply the ICR mass spectrometer with the mixture of substances from the separation process somewhat later. However, it is also possible for the mixtures of substances to be ionized in just a single ion source, and for the ion beam to be split in the vacuum system before the two partial beams are fed to the two mass analyzers. The splitter may operate in space or in time: it may generate two parallel ion beams for the two analyzers, or may sent a single beam alternately to the two mass analyzers.

The filling of the measuring cell in the ICR mass spectrometer should be regulated with the aid of a parameter that is obtained from the reference spectrum. This can be the integral of all the ion masses in the ion current, but may also be a mass-dependent, weighted integral taken over the ion current. A parameter that describes the largest collection of ions in a restricted range of masses within the mass spectrum has been found to be particularly favorable. The parameter can thus be calculated as the "maximum of a sliding average", where the sliding average is obtained by multiplying the reference spectrum with a sliding notch function. The maximum of the sliding average obtained in this way then forms the regulating parameter. The notch function can be a rectangle, whose width can be specified on the mass scale (the normal sliding average), but may also be a triangular or Gaussian function (a weighted sliding average). This method permits filling in which the highest intensity of a mass range with one or more strong mass signals is used as the regulating parameter, thus exploiting the observable effect that, in practice, ions of quite different masses cause very little deterioration in the resolution or the mass accuracy. Of course, any mixture of the functions mentioned above can be used.

The use of the maximum of a sliding average as regulating parameter is interesting: if, for instance, the mass spectrum consists of 10 ion signals of the same intensity, and if the masses are evenly distributed over the measured mass range, the measuring cell can, without deterioration in the measurements, take about 10 times as many ions as it could if only a single ion species were present. This also accords with the observable effects. This can be explained by the fact that the ions of one ion species, which remain substantially together in their orbits, interfere with each other more strongly through Coulomb repulsion than do other ion species, which have their own cyclotron frequency and only occasionally, while overtaking, fly through the cloud of other ion species. However, ions of species whose masses are almost the same cause the regulating parameter to be reduced, in order to avoid both induced disturbances and "peak coalescence".

On the basis of further experience it is possible to obtain algorithms for the calculation of the regulating parameter in different ways. For instance, it can be favorable to handle heavy ions in a different way from light ions. This can be done by introducing a mass-dependent weighting factor.

The reference mass analyzer used in parallel can, for instance, be a time-of-flight mass spectrometer with orthogonal ion injection (OTOF). This time-of-flight mass spectrometer can be relatively small, since high mass accuracy is not important. Even with a flight-tube only 30 centimeters long, a spectrometer with a reflector can achieve a resolution of about 3000 or 5000, which is quite adequate for the present purposes.

Ideally the reference mass spectrometer would use the same ion generation and ion guide system as the ICR spectrometer, in other words the same ion source, same ion guide, and, if relevant, the same ion selection and ion fragmentation stages. It is then possible for all the processes to which the ions are subjected on the path to the mass-spectroscopic analyzer itself to be carried out in the same way.

The two mass analyzers can also share parts of the vacuum pump system. They can even share parts of the ion generation and further ion guidance systems, in which case the ion currents will have to be split somewhere before the two mass analyzers. The common ion guidance systems may include ion selection and ion reaction stages, for instance, ion fragmentation reactions. The splitting can involve a partition of the ion currents that remains constant in time, but can also be a time-based split, feeding the ion mixtures to the two mass analyzers in temporal alternation.

BRIEF DESCRIPTION OF THE DRAWINGS

The above and further advantages of the invention may be better understood by referring to the following description in conjunction with the accompanying drawings in which.

DETAILED DESCRIPTION

Figure 1:
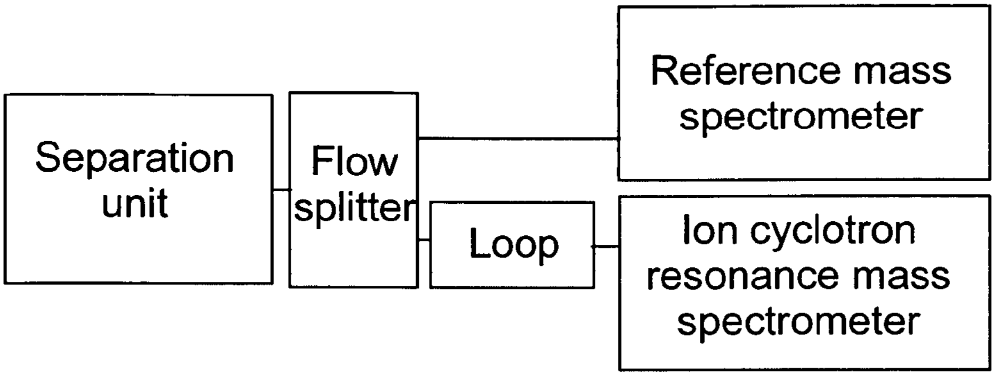
FIG. 1 illustrates an example of an arrangement in which two mass spectrometers are operated in parallel in accordance with this invention. The eluate produced by a separation unit is divided by a splitter and sent separately to the two mass spectrometers; the flow to the ion cyclotron resonance mass spectrometer is held back by a delay loop.
Figure 2:
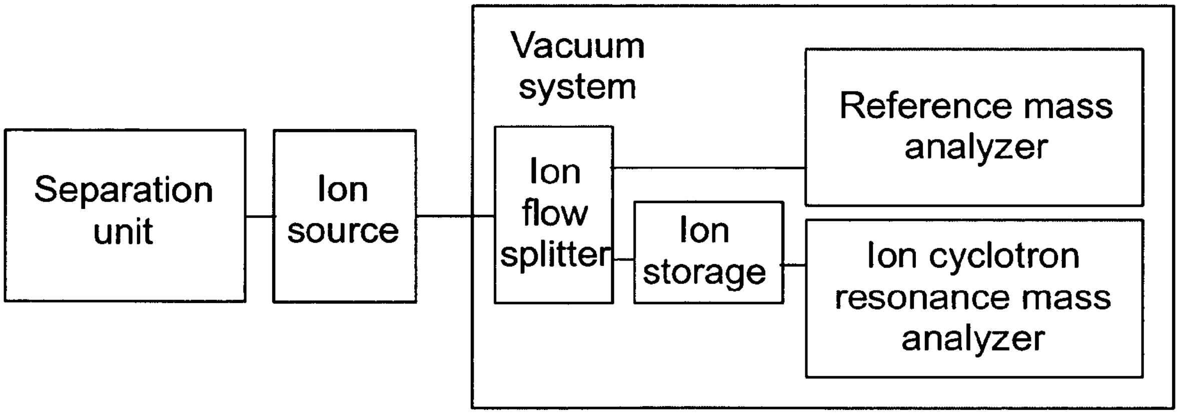
FIG. 2 illustrates an example of an arrangement in which two mass analyzers are integrated in a vacuum system, where they are operated in parallel. The eluate from the separation unit is here only sent to a single ion source, and the ion currents are not divided until they reach the ion flow splitter in the vacuum system. The ion current being sent to the ion cyclotron resonance mass analyzer can be delayed by an ion storage unit.

A first embodiment consists in the parallel operation of an FTICR mass spectrometer and an entirely independent time-of-flight mass spectrometer with orthogonal ion injection. The time-of-flight mass spectrometer is used as the reference mass spectrometer, and has an ion source of the same type, an ion inlet into the vacuum system of the same type and, apart from any differences necessitated by the nature of the system, equipment of the same type for feeding the ions in the vacuum to the mass analyzer. The two ion sources are connected to the same separation equipment through a device for dividing the liquid flows (the "flow splitter"); in this case the separation equipment may consist of apparatus for liquid chromatography or for capillary electrophoresis. The parameter used to regulate filling of the measuring cell of the FTICR mass spectrometer is then calculated from the reference mass spectrum obtained by the time-of-flight mass spectrometer.

For a slow liquid chromatography process, it is acceptable for the mixtures of substances emerging from the splitter to be delivered synchronously to the two ion sources. Recording the reference mass spectrum in the time-of-flight mass spectrometer only takes a few tenths of a second, and the evaluation required, up to calculation of the parameter used to control the filling of the FTICR mass spectrometer, adds only a few tenths of a second. During this period of between a half and a whole second, the mixture in the eluate emerging from the liquid chromatography unit only changes very little; the regulating parameter calculated on the basis of the reference mass spectrum can well be used here, even though a short time does elapse between measuring the reference mass spectrum and filling the measuring cell.

Modern separators, however, are achieving increasingly sharp separations, and consequently shorter and shorter peak widths for the separated substances. The use of very fine capillaries in what is called the nano-LC itself shortens the time in which a substance is delivered from more than ten seconds for the normal-LC down to a few seconds in the nano-LC. Capillary electrophoresis can achieve substance peak widths of between one and five seconds. In electrophoretically supported capillary chromatography, the peak widths are already less than one second. Substance peak widths of only a few tenths of a second are also generated in chip-based micro-separation systems. For separation systems of this type, in which the substance mixtures change greatly within tenths of a second, synchronous delivery of the ion mixtures to the two mass spectrometers is no longer usable, due to the time delay between measuring the reference mass spectrum and controlling the filling of an FTICR mass spectrometer.

The flow of liquid between the splitter and the ion source of the FTICR mass spectrometer can, in these cases, be delayed by a loop in the transport capillary, so that the same mixture of separated substances is measured somewhat sooner in the time-of-flight mass spectrometer. The time difference must be sufficient for a reference mass spectrum to be acquired in the time-of-flight mass spectrometer, for the reference mass spectrum to be evaluated, and for the parameter that will control filling of the measurement cell of the FTICR mass spectrometer to be calculated. This parameter is then used to control filling of the measurement cell of the FTICR mass spectrometer with exactly the same mixture of ions, but delivered a little later. In this method the ion mixture used to fill the cell is identical to the ion mixture whose reference mass spectrum was measured in the time-of-flight mass spectrometer.

The term "parameter" here should not be restricted to a single number, in spite of the fact that in general a single numerical value is sufficient to control the filling. There are more complicated filling processes, however, where the expression "parameter" should be read as "set of parameters" used to control these filling processes, e.g. by cutting off high ion masses or low ion masses from being filled into the ICR measuring cell. It is even possible to suppress a single kind of ions during the filling process to avoid overloading the cell by just this kind of ions.

As parameter used to control the filling, it is possible, for instance, to take an integral over the reference mass spectrum; even better is to use a mass-weighted integral over the reference mass spectrum. The mass-weighted integral can take into account the fact that ions of different masses in the FTICR mass spectrometer interfere with each other in different ways.

In these descriptions, the term "mass" always refers, as is usual in mass spectrometry, to the charge-related mass m/z, that is the physical mass m divided by the number z of elementary charges on the ion.

The integral taken over the reference mass spectrum does not, however, take into account the fact that the bunches of ions of widely differing masses scarcely disturb each other at all in the FTICR mass spectrometer, since they move with very different orbital frequencies, and therefore only come near to one another when overtaking. The maximum value of a sliding average over the reference mass spectrum is much more favorable, as the regulating parameter; the width of the sliding average should be chosen in such a way that the determination of mass is highly reproducible. In other words, the maximum intensity over all small ranges of masses is looked for. This involves, in a broad sense, the generation of a correlation function $K(\tau)$ from the reference mass spectrum $S(m)$ and a notch function $A(\tau-m)$: $K(\tau)=\int S(m)\times A(\tau-m)\,dm$. For a sliding average, the notch function is rectangular; other notch functions, such as triangular or Gaussian functions, can, however, be used to calculate the regulating parameter. In each case, the maximum of this correlation function, K, is used as the regulating parameter.

The maximum of the correlation function, K, is logically described here as the "maximum of a sliding average", since it refers to the maximum intensity in a small range of masses selected from all the small mass ranges in the reference mass spectrum.

A parameter of this type has surprising properties. If, for instance, the reference mass spectrum has 10 ion species of various masses evenly distributed across the spectrum, it is possible for 10 times as many ions to be loaded into the FTICR mass spectrometer's measuring cell as would be the case if the reference mass spectrum only contained a single ion species. Practical experience indicates very much the same thing: highly linear spectra with large numbers of ion species generally yield much better mass determinations than spectra with very few ion species; in any event this was the case when reference samples with a large number of substances were used during calibration of the FTICR mass spectrometer.

Even better results can be achieved using parameters obtained from a combination of the maximum of the correlation function (the maximum of the sliding average) with the integral over the mass spectrum (the total charge), because then the influence of the ions with largely different masses can be considered, too.

The reference mass spectrometer does not, of course, have to be a time-of-flight mass spectrometer. Practically any other kind of mass spectrometer can be used, such as an ion trap mass spectrometer, a quadrupole filter mass spectrometer, or even a magnetic sector field mass spectrometer. The reference mass spectrometer can be very small; it should, however, cover the mass range of the FTICR mass spectrometer. This can already be difficult in the case of ion trap mass spectrometers. If a mass spectrometer with a very low resolution is used, the maximum intensity of the spectrum recorded in this way can itself form the regulating parameter, as the low resolution means that the output is already a sliding average value.

Furthermore, it is not necessary for the reference mass spectrometer to consist of an entirely separate, independent mass spectrometer. The two mass spectrometers can, for instance, share the same pump system. Both mass spectrometers can be built into the same housing. They can even use the same ion source, in which case the splitter is not located in the feed of substances upstream of the ion source, but in the path of the ion current on the way to the two mass analyzers. Here again, simultaneous supply of the ion mixtures to the two mass analyzers can be avoided through the use of ion storage units. Suitable means are known to the specialist. When the two devices are closely integrated, only a single mass spectrometer is externally visible; internally, however, it consists of two mass analyzers, a reference mass analyzer and an FTICR mass analyzer.

Within the vacuum system, the ions do not simply have to be guided to the mass analyzers; it is instead possible for individual ion species to be selected by an ion filter and to be fragmented in a fragmentation unit to create daughter ions. These daughter ions are passed on to the mass analyzer, where they are measured as daughter ion spectra. Bearing in mind the idea of the invention, it is clear that the selection and fragmentation units on the two ion paths to the two mass analyzers must be as similar as possible. Here it is particularly expedient if the selection and fragmentation are carried out using devices in which the ion source, ion inlet into the vacuum and other ion guidance systems can be used jointly. Selection and fragmentation (or other types of ion reactions) can then be located on that part of the path through which the ions all travel before the ion current is split and sent separately to the two mass analyzers.

The necessary equipment is easily determined on the basis of the descriptions of the method and the figures.

What is claimed is:

1. A method for regulating the filling process for the measuring cell of an ion cyclotron resonance mass analyzer with mixtures of ions, generated from a flow of substances, comprising the steps (a) providing an ion cyclotron resonance mass analyzer with a measuring cell, (b) providing a reference mass analyzer, (c) supplying a fraction of the mixture of ions to the reference mass analyzer and acquiring a reference mass spectrum;

(d) evaluating the reference mass spectrum to obtain parameters to regulate the filling process, and (e) regulating the filling process of the measuring cell of the ion cyclotron resonance mass analyzer by these parameters.

2. Method according to claim 1, wherein a sliding average over the reference mass spectrum is used as a regulating parameter.

3. Method according to claim 2, wherein a rectangular function, a Gaussian function or a triangular function is used to calculate the sliding average value.

4. Method according to claim 3, wherein the width of the rectangular function, Gaussian function or triangular function can be selected.

5. Method according to claim 2, wherein the sliding average values are weighted according to mass.

6. Method according to claim 1, wherein the fraction of the mixture of ions supplied to the ion cyclotron resonance mass analyzer is delayed with respect to the supply to the reference analyzer.

7. Ion cyclotron resonance mass spectrometer, comprising (a) an ion source, (b) an ion beam splitter, (c) an ion cyclotron resonance mass analyzer, receiving a part of the ion beam from the splitter, (d) a reference mass analyzer, receiving another part of the ion beam from the ion beam splitter for the acquisition of reference mass spectra, (e) an evaluation system to evaluate reference spectra to obtain filling regulating parameters for the measuring cell of the ion cyclotron resonance mass analyzer, and (f) control devices for the filling process of the measuring cell of the ion cyclotron resonance mass analyzer.

8. Ion cyclotron resonance mass spectrometer according to claim 7, additionally comprising at least one ion selection and reaction stage.

9. Ion cyclotron resonance mass spectrometer according to claim 7, additionally comprising an ion storage device for the part of the mixture of ions that is supplied to the ion cyclotron resonance mass analyzer.

10. Ion cyclotron resonance mass spectrometer according to claim 7, comprising an ion beam splitter which supplies the ion beam to the two mass analyzers in temporal alternation.

11. Ion cyclotron resonance mass spectrometer system, comprising (a) a substance mixture separation device, generating a flow of separated substances, (b) a flow splitter, (c) an ion cyclotron resonance mass spectrometer, receiving a part of the flow from the flow splitter, (d) a reference mass spectrometer, receiving another part of the flow from the flow splitter for the acquisition of reference mass spectra, (e) an evaluation system to evaluate reference spectra to obtain filling regulating parameters for the measuring cell of the ion cyclotron resonance mass spectrometer, and (f) a control device for the filling process of the measuring cell of the ion cyclotron resonance mass spectrometer.

12. Ion cyclotron resonance mass spectrometer system according to claim 11, comprising a delay loop for the flow of substances towards the ion source for the ion cyclotron resonance mass analyzer.

* * * * *